United States Patent
Botella et al.

(10) Patent No.: US 11,149,658 B2
(45) Date of Patent: Oct. 19, 2021

(54) ANTI-RATTLE VALVE, EXHAUST LINE COMPRISING SUCH VALVE AND METHOD FOR MANUFACTURING SUCH VALVE

(71) Applicant: FAURECIA SYSTEMES D'ECHAPPEMENT, Nanterre (FR)

(72) Inventors: Ronan Botella, Chevremont (FR); Gilbert Delplanque, Sochaux (FR)

(73) Assignee: FAURECIA SYSTEMES D'ECHAPPEMENT

( * ) Notice: Subject to any disclaimer, the term of this patent is extended or adjusted under 35 U.S.C. 154(b) by 7 days.

(21) Appl. No.: 16/643,631

(22) PCT Filed: Oct. 3, 2017

(86) PCT No.: PCT/EP2017/075088
§ 371 (c)(1),
(2) Date: Mar. 2, 2020

(87) PCT Pub. No.: WO2019/048071
PCT Pub. Date: Mar. 14, 2019

(65) Prior Publication Data
US 2020/0408156 A1    Dec. 31, 2020

Related U.S. Application Data

(60) Provisional application No. 62/554,066, filed on Sep. 5, 2017.

(51) Int. Cl.
*F02D 9/10* (2006.01)
*F16K 1/22* (2006.01)
(Continued)

(52) U.S. Cl.
CPC ............. *F02D 9/107* (2013.01); *F02M 26/70* (2016.02); *F02D 9/1065* (2013.01); *F16K 1/225* (2013.01); *F16K 27/0218* (2013.01)

(58) Field of Classification Search
CPC . F16K 1/225; F16K 1/224; F16K 1/22; F16K 1/222; F16K 1/221; F16K 27/0218;
(Continued)

(56) References Cited

U.S. PATENT DOCUMENTS 5,203,539 A * 4/1993 Stary ....................... F16K 1/222
251/173
2007/0131889 A1* 6/2007 Unbehaun ................. F02D 9/04
251/305

(Continued)

FOREIGN PATENT DOCUMENTS

DE    102006048713 A1    4/2008
DE    102009052423 A1    5/2011
(Continued)

*Primary Examiner* — Kelsey E Cary
(74) *Attorney, Agent, or Firm* — Carlson, Gaskey & Olds, P.C.

(57) ABSTRACT

A valve includes a flap, a tubular valve body defining a passageway, and a guiding device to guide the flap relative to the valve body for pivoting the flap relative to the valve body about a pivot axis between a closed position and an open position of the passageway. The guiding device comprises a pin traversed by the pivot axis and comprising a body with a base and, opposite the base, a free end resting against the valve body. The pin also comprises two lugs each protruding from the base in a direction opposite to the free end, the two lugs defining between them a slot, wherein an edge of the flap is received. The valve further comprises at least one member, connected to the flap, and which presses one of the lugs of the pin against the flap.

20 Claims, 6 Drawing Sheets

(51) Int. Cl.
*F02M 26/70* (2016.01)
*F16K 27/02* (2006.01)

(58) Field of Classification Search
CPC ..... F16K 31/5282; F02M 26/70; F02D 9/107; F02D 9/106; F02D 9/1065; F02D 9/04
See application file for complete search history.

(56) References Cited

U.S. PATENT DOCUMENTS

2011/0297862 A1* 12/2011 Womann ............. F16K 27/0218
                                            251/305
2015/0102250 A1*  4/2015 Chen ................... F16K 1/222
                                            251/306
2018/0142790 A1*  5/2018 Rybarz ................ F16C 25/083

FOREIGN PATENT DOCUMENTS

| EP | 0821191 A1 | 1/1998 |
| JP | 06241326 | 8/1994 |
| JP | 08312389 | 11/1996 |
| JP | 6039744 B1 | 12/2016 |

\* cited by examiner

ANTI-RATTLE VALVE, EXHAUST LINE COMPRISING SUCH VALVE AND METHOD FOR MANUFACTURING SUCH VALVE

CROSS-REFERENCE TO RELATED APPLICATIONS

This application is the US national phase of PCT/EP2017/075088 which was filed on Oct. 3, 2017, which claims priority to U.S. Provisional Application No. 62/554,066 filed on Sep. 5, 2017.

TECHNICAL FIELD

The present disclosure relates to a valve, of the type comprising a flap, a tubular valve body defining a passageway, and a guiding device to guide the flap relative to the valve body for pivoting the flap relative to the valve body about a pivot axis between a closed position and an open position of the passageway, the guiding device comprising a pin traversed by the pivot axis and comprising:
- a body with a base and, opposite the base, a free end resting against the valve body, and
- two lugs each protruding from the base in a direction opposite the free end, said lugs defining a slot between them, in which an edge of the flap is received.

The disclosure also relates to a motor vehicle exhaust line comprising such a valve, and a method for manufacturing such a valve.

BACKGROUND

The valves of the aforementioned type are known and are generally mounted on motor vehicle exhaust lines, where they are used to regulate the flow of exhaust gases from a heat engine. Most often, the valve body and the flap of these valves are made from steel, and the pin is made from ceramic, since this material has good tribological characteristics with respect to steel.

One drawback related to the use of these materials is that the pin is very brittle and risks breaking if an excessive separating force is applied between the lugs of the pin. In order to accommodate the thermal expansion of the flap, a space is generally left between these lugs greater than the thickness of the flap. Thus, despite the very high temperatures to which the valve may be subjected in an exhaust line, the flap can expand without risk of bearing against the lugs of the pin.

The play thus left between the flap and the lugs is, however, problematic. Indeed, due to this play, the flap can move relative to the pin. Yet the flow of exhaust gases that the flap opposes exerts a force on the flap of variable intensity that causes to-and-fro movements of the flap, which abuts, upon each to-and-fro movement, against the lugs of the pin, causing a chattering noise that is audible for the occupants of the passenger compartment. This rattling noise gives users an impression of poor quality of the vehicle that may be particularly detrimental for top-of-the-line vehicles.

The rattling noise should be eliminated simply and economically.

SUMMARY

A valve of the aforementioned type, also comprises at least one pressing member, connected to the flap, to press one of the lugs of the pin against said flap.

According to specific embodiments, the valve also has one or more of the following features, considered alone or according to any technically possible combination(s):
- said lug is embedded between the pressing member and the flap;
- the pressing member is attached, in particular welded, on a face of the flap;
- the slot has a width greater than a thickness of the flap;
- the flap and the pin have different thermal expansion coefficients from one another;
- the pin has a lower thermal expansion coefficient from that of the flap;
- the flap is made from metal and the pin is made from ceramic;
- the flap, the valve body, and the guiding device together form a butterfly valve; and
- the valve comprises a motorized actuator to control the movement of the flap between its closed and open positions.

The disclosure also relates to a motor vehicle exhaust line comprising a valve as defined above.

The disclosure also relates to a method for manufacturing a valve as defined above, comprising the following steps:
- supplying the flap and the pin assembled to one another,
- supplying the pressing member, the pressing member comprising two tongues together defining a bearing plane of the pressing member against the flap and having, between the tongues, a recess having a maximal depth smaller than the thickness of at least one of the lugs of the pin,
- positioning the pressing member against the flap, the bearing plane bearing against the flap and the lug being received in the recess, and
- welding the tongues of the pressing member to the flap.

According to one particular embodiment, the method also has the following feature:
- the step for supplying the pressing member comprises supplying a metal strip or plate, followed by the stamping or sintering of said strip or plate to form the pressing member.

BRIEF DESCRIPTION OF THE DRAWINGS

Other features and advantages of the disclosure will appear upon reading the following description, provided solely as an example and done in reference to the appended drawings, in which.

DETAILED DESCRIPTION

Figure 1:
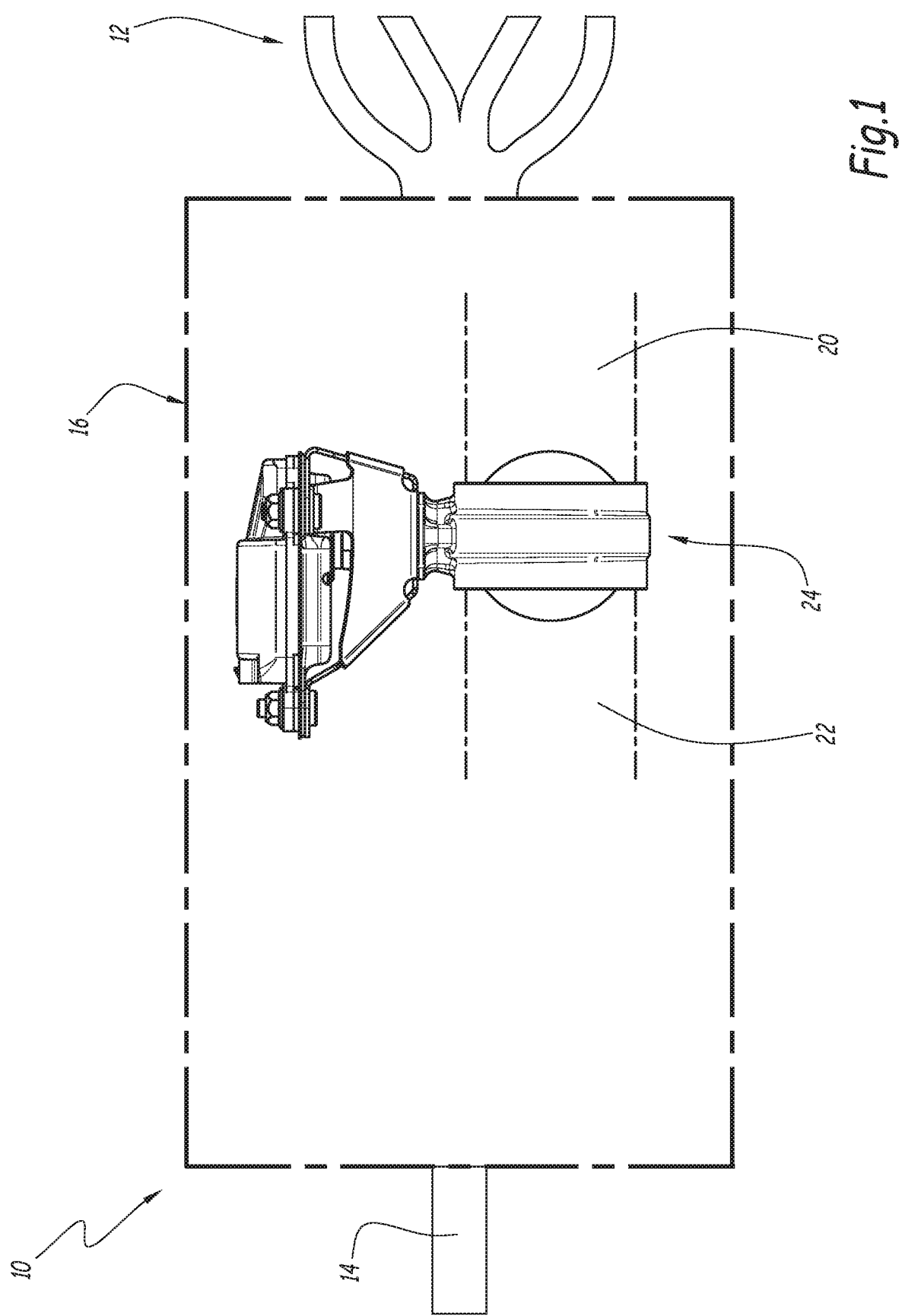
FIG. 1 is a schematic view of an exhaust line according to one exemplary embodiment.

The exhaust line 10 shown in FIG. 1 is embedded in a motor vehicle (not shown). It comprises, in a known manner, a manifold 12 for collecting the exhaust gases from a heat engine (not shown) of the vehicle, an outlet orifice 14 for releasing the exhaust gases outside the vehicle and, between the manifold 12 and the orifice 14, a network of pipes 16 for guiding the exhaust gases from the manifold 12 to the orifice 14.

The network of pipes 16 preferably includes at least one piece of pollution control equipment (not shown) for controlling pollution from the exhaust gases and at least one piece of noise control equipment (not shown) suitable for minimizing the sound produced by the exhaust gases when they exit through the outlet orifice 14.

The network of pipes 16 also includes an upstream exhaust gas intake pipe 20, a downstream exhaust gas discharge pipe 22 and, interposed between the upstream and downstream pipes 20, 22, a valve 24 whose role is to monitor the passage of the exhaust gases between the upstream and downstream pipes 20, 22. Optionally, this valve 24 is part of a piece of pollution control equipment or a piece of noise control equipment of this network of pipes 16.

Figure 2:
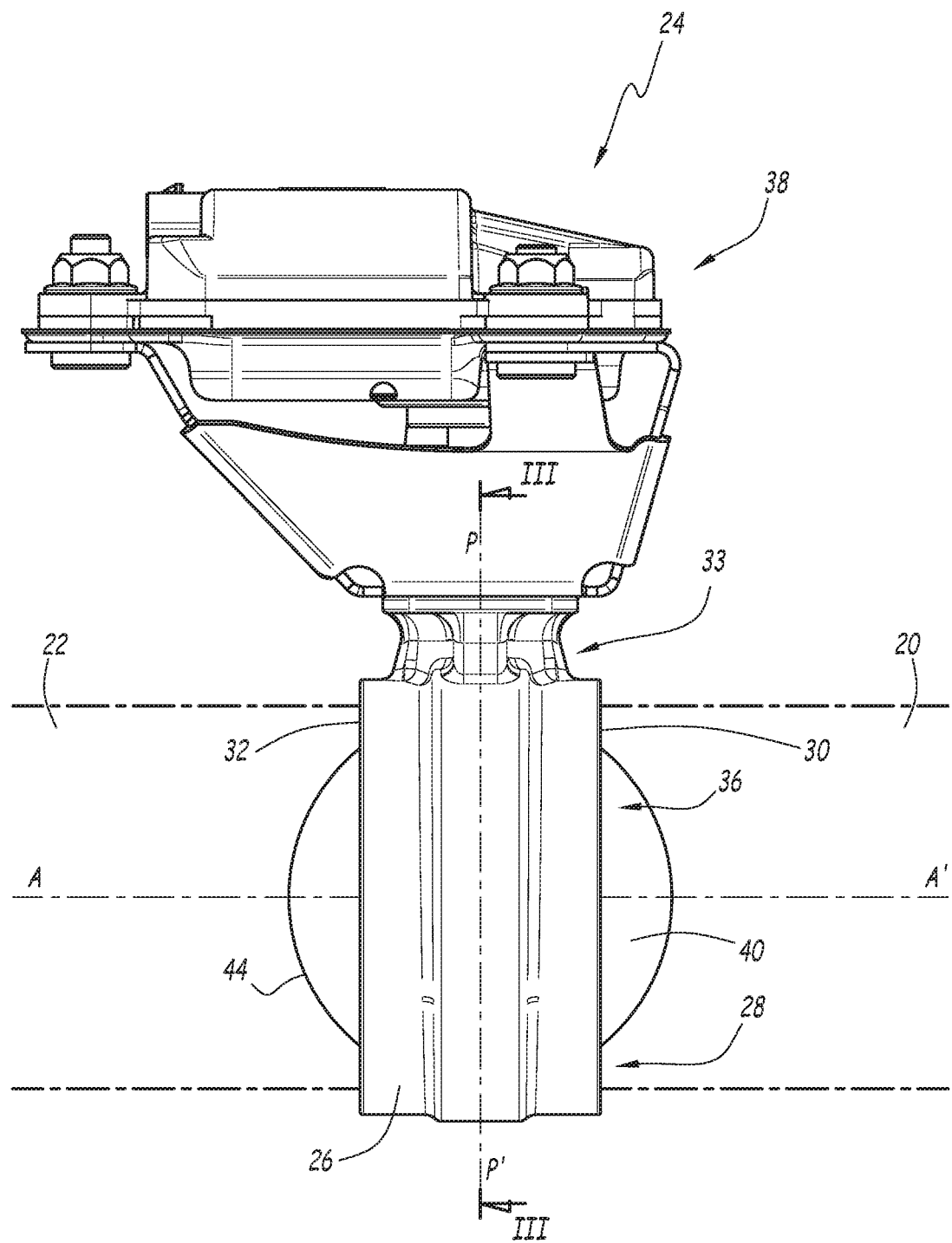
FIG. 2 is an elevation side view of the exhaust line of FIG. 1.

In reference to FIG. 2, the valve 24 comprises a tubular valve body 26, intended to conduct the exhaust gases, defining a passageway 28 extending along the central axis A-A' from an upstream end 30, fluidly connected to the upstream pipe 20, to a downstream end 32, fluidly connected to the downstream pipe 22.

Hereinafter, the orientation terms are to be understood in reference to the usual orientation of an axis, the descriptor "axial" designating the directions parallel to the axis A-A' and the descriptor "radial" designating the directions perpendicular to the axis A-A'. It will be noted that "perpendicular" is used here to designate directions orthogonal to one another and having a point of intersection.

The valve body 26 also has a fastening flange 33 and has a through opening 34 (FIG. 3) along a radial direction P-P', said opening 34 extending through the flange 33 and emerging radially in the passageway 28 and outside the valve body 26.

Figure 3:
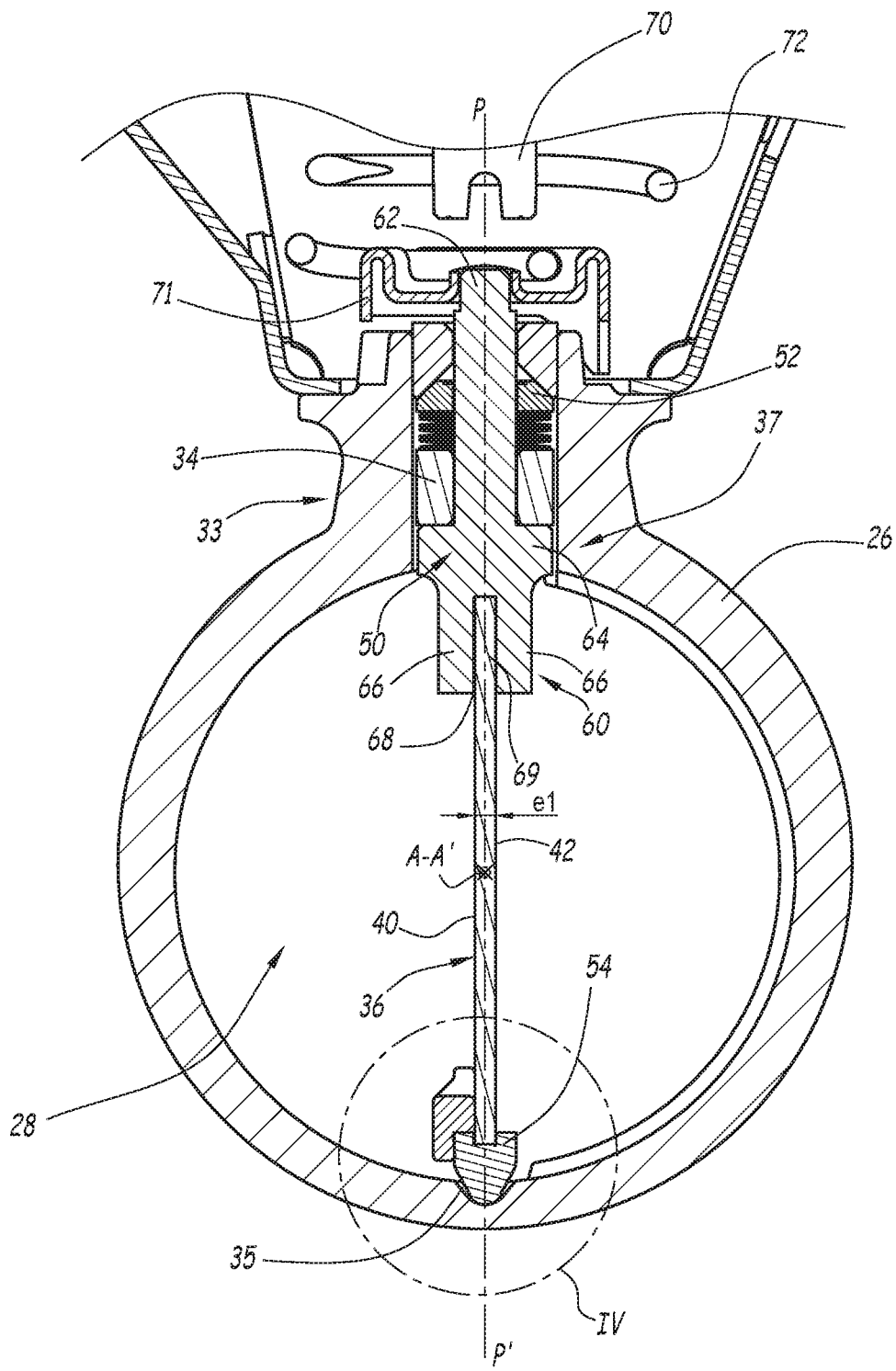
FIG. 3 is an axial sectional view, along a plane marked III-III in FIG. 2, of the valve of FIG. 2, according to another exemplary embodiment.

In reference to FIG. 3, the valve body 26 further defines a recess 35 in an inner face of the body 26 oriented toward the passageway 28. This recess 35 is arranged diametrically opposite the through opening 34 relative to the axis A-A', and it is aligned with the radial direction P-P'. The recess 35 typically has a frustoconical shape with a hemispherical bottom.

The valve 24 also comprises a flap 36 movable inside the body 26, and a guide device 37 that guides the flap 36 relative to the body 26 to allow the pivoting of the flap 36 relative to the body 26 around the direction P-P' between a closed position and an open position of the passageway 28, said direction P-P' thus constituting a pivot axis of the flap 36. This pivot axis P-P' thus being radial, the valve body 26, the flap 36 and the guide device 37 together form a butterfly valve.

The valve 24 also comprises a motorized actuator 38 to command the movement of the flap 36 between its closed and open positions.

As shown in FIGS. 2 and 3, the flap 36 is substantially planar. It thus comprises two large faces 40, 42, each planar and substantially parallel to the other, said faces 40, 42 being connected to one another by an edge 44 of the flap 36. Each of the large faces 40, 42 has a shape substantially complementary to the radial section of the passageway 28.

In the closed position, the flap 36 is oriented substantially transversely to the passageway 28, i.e., each of its large faces 40, 42 is arranged substantially perpendicular to the axis A-A'. In the open position, shown in FIGS. 2 and 3, the flap 36 is oriented substantially parallel to the passageway 28, i.e., each of its large faces 40, 42 is arranged substantially parallel to the axis A-A'.

The flap 36 has a thickness e1, defined as being the distance of the large faces 40, 42 from one another.

The flap 36 is typically made from metal, for example from steel.

In reference to FIG. 3, the guiding device 37 comprises a shaft 50 engaged in the opening 34 and connected to the flap 36, a bearing 52 for guiding the shaft 50 relative to the body 26, and a pin 54 passed through by the pivot axis P-P', engaged in the recess 35 and connected to the flap 36.

The shaft 50 is substantially coaxial to the axis P-P' and extends all the way through the opening 34. It has a first end 60 for connecting to the flap 36, and a second end 62 for connecting to the actuator 38.

The shaft 50 is connected to the flap 36 in rotation about the axis P-P'. To that end, the first end 60 comprises, in the illustrated example, a base 64 and two lugs 66 protruding from the base 64 toward the center of the passageway 28, said lugs 66 defining a slot 68 between them in which a edge 69 of the flap 36 is received. Advantageously, the flap 36 is further welded to the shaft 50.

The shaft 50 is able to be rotated about the axis P-P' by the actuator 38. To that end, the second end 62 is secured to a driving part 71, which in turn is connected to an output shaft 70 of the actuator 38 with a connecting member 72.

The connecting member 72 is preferably configured to minimize the heat transfers between the shaft 50 and the output shaft 70. To that end, in the illustrated example, the connecting member 72 is made up of a metal strand configured in a spiral.

The shaft 50 is typically made from metal, for example from steel, and preferably from stainless steel.

The bearing 52 here is housed in the opening 34. It is typically formed by a ring of material with a low friction coefficient, for example a ceramic, arranged between the shaft 50 and a wall of the opening 34.

Figure 4:
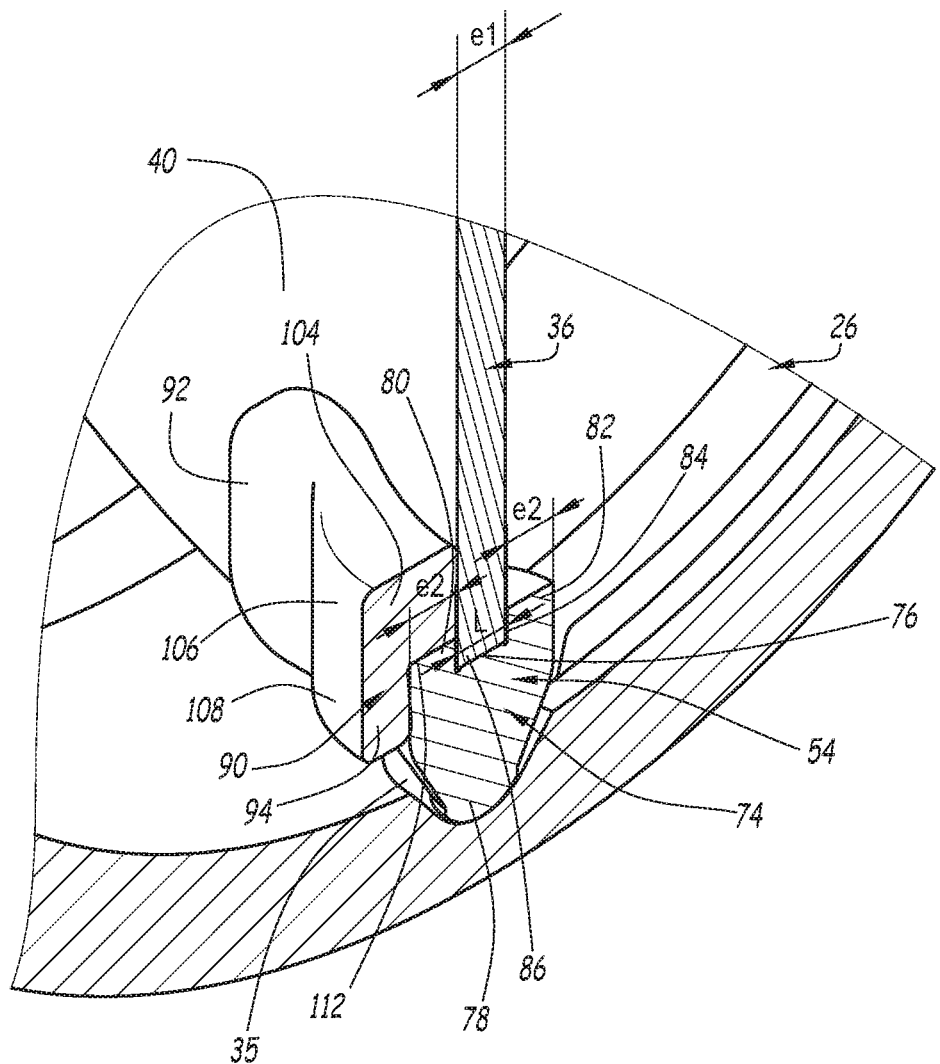
FIG. 4 is a perspective and sectional view of a detail marked IV of FIG. 3.

In reference to FIG. 4, the pin 54 comprises a body 74 with a base 76 and, opposite the base 76, a free end 78 passed through by the pivot axis P-P', received in the recess 35 and bearing against the valve body 26. The pin 54 also comprises two lugs 80, 82 each protruding from the base 76 in a direction opposite the free end 78, toward the center of the passageway 28, said lugs 80, 82 defining a slot 84 between them in which is received an edge 86 of the flap 36 opposite the edge 69.

The pin 54 is, for example, made exclusively from ceramic. It has a thermal expansion coefficient lower than that of the flap 36 and a stiffness typically below 7 MPa·m$^{1/2}$.

Each lug 80, 82 has a half-cylinder shape and has a thickness e2, taken as being the maximum distance from a point of the lug 80, 82 to the slot 84 in a direction perpendicular to the plane of the faces 40, 42 of the flap 36. This thickness e2 is preferably substantially the same for both lugs 80, 82.

The slot 84 has a width L, defined as the distance of the lugs 80, 82 from one another, greater than the thickness e1 of the flap 36. Thus, the slot 84 leaves enough space from the edge 86 of the flap 36 so that it can expand without risk of causing breaking of the pin 54.

According to the disclosure, the valve 24 also comprises a pressing member 90, connected to the flap 36, for pressing one of the lugs 80, 82, here the lug 80, against said flap 36. This pressing member 90 keeps the lug 80 pressed against the flap 36.

The lug 80 is in particular embedded between the pressing member 90 and the flap 36.

Preferably, as shown, the pressing member 90 is attached, in particular welded, on one of the large faces 40, 42 of the flap 36, here the face 40. The pressing member 90 can thus be made particularly simply and economically.

The pressing member 90 is advantageously, as shown, substantially symmetrical relative to a median plane M (FIG. 5) perpendicular to the faces 40, 42 of the flap 36 and passing through the pivot axis P-P'.

The pressing member 90 is formed in one piece. It comprises, on each side of said median plane M, a substantially planar tongue 92. It also comprises a material bridge 94 coupling said tongues 92 to one another.

Figure 5:
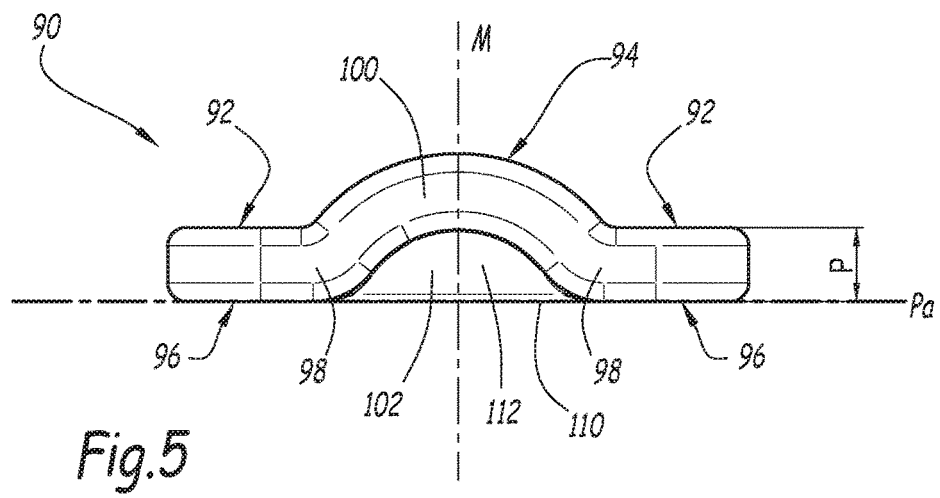
FIG. 5 is an elevation bottom view of a pressing member of the valve of FIG. 2, according to the exemplary embodiment of FIG. 3.

As shown in FIG. 5, each tongue 92 has a face 96 bearing against the flap 36. This face 96 is substantially planar and substantially coplanar with the bearing face 96 of the other tongue 92. Said bearing faces 96 thus define a bearing plane $P_a$ of the pressing member 90 against the flap 36.

Preferably, welding spots (not shown) are formed between each tongue 92 and the flap 36.

The material bridge 94 is in the shape of an arch with two feet 98 each in contact with a respective tongue 92 and an apex 100 separated from the plane $P_a$. It defines a recess 102 for receiving a lug 80, 82, emerging in the bearing plane $P_a$, said recess 102 having a maximum depth p defined as being the distance from the apex 100 to the plane $P_a$. This depth p is advantageously, before fastening of the pressing member 90 on the flap 36, less than the thickness e2 of the lug 80.

The material bridge 94 advantageously, as shown, has a thickness substantially equal to the thickness of the tongues 92.

The pressing member 90 is typically made up of a strip or plate of stamped steel in order to form the recess 102, which is particularly economical, or by a strip or plate of sintered steel in order to form the recess 102, which allows greater precision in controlling the depth p. In a variant, the pressing member 90 is made up of a strip or plate of machined steel in order to form the recess 102.

Figure 6:
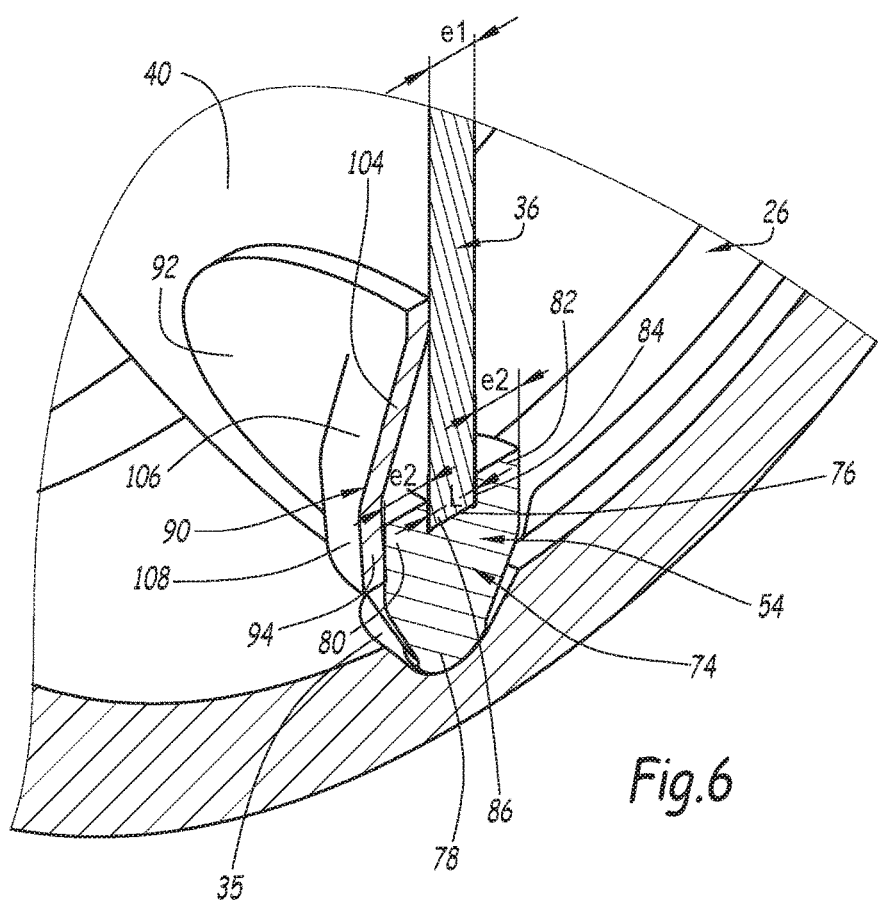
FIG. 6 is a view similar to that of FIG. 4, according to another exemplary embodiment.

In reference to FIGS. 4 and 6, in the first and second variants of the disclosure, the pressing member 90 also comprises a junction 104 joining the tongues 92 to one another, parallel to the material bridge 94. This junction 104 has an outer face 106 extending continuously from one tongue 92 to the other, said outer face 106 being flush with an outer face 108 of the material bridge 94, and a planar inner face 110 (FIG. 5), extending continuously from one tongue 92 to the other end being flush with the bearing plane $P_a$.

In reference to FIGS. 4 and 5, in the first variant, the junction 104 has a thickness greater than that of the tongues 92 and defines a planar shoulder 112, substantially orthogonal to the axis P-P', oriented toward the recess 110, the lug 80 bearing against said shoulder 112. This variant allows a better stability of the pin 54 along the axis P-P'.

Figure 7:
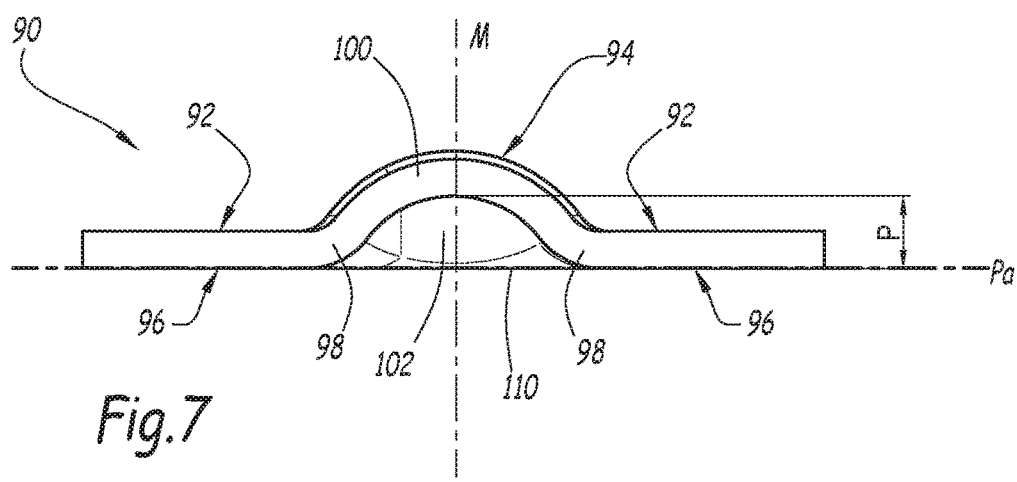
FIG. 7 is a view similar to that of FIG. 5, according to the exemplary embodiment of FIG. 6.

In reference to FIGS. 6 and 7, in the second variant, the junction 104 has a thickness substantially equal to that of the tongues 92, and its distance from the bearing plane $P_a$ increases from the inner face 110 to a junction line (not shown) with the material bridge 94. Preferably, welding spots (not shown) are then formed between the inner face 110 and the flap 36. This variant allows better holding of the pressing member 90 on the flap 36.

Figure 9:
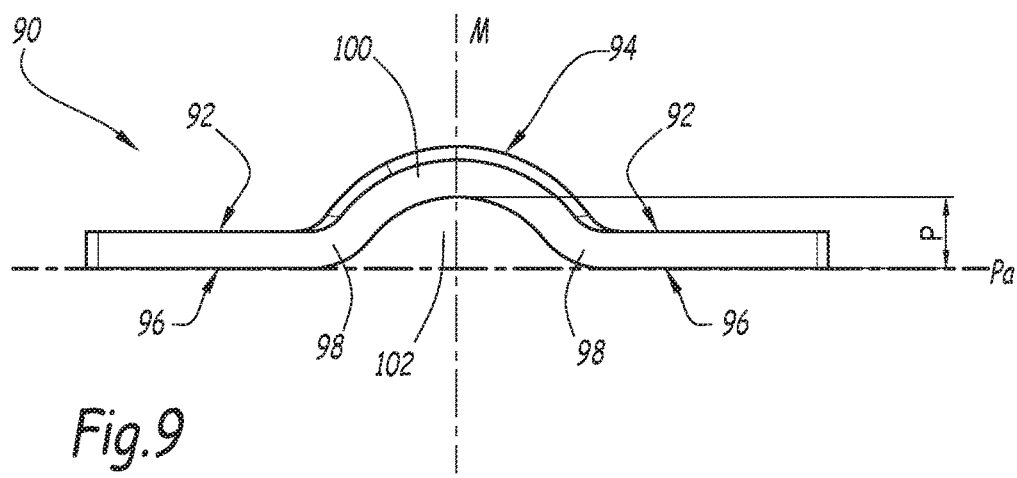
FIG. 9 is a view similar to that of FIG. 5, according to the exemplary embodiment of FIG. 8.
Figure 8:
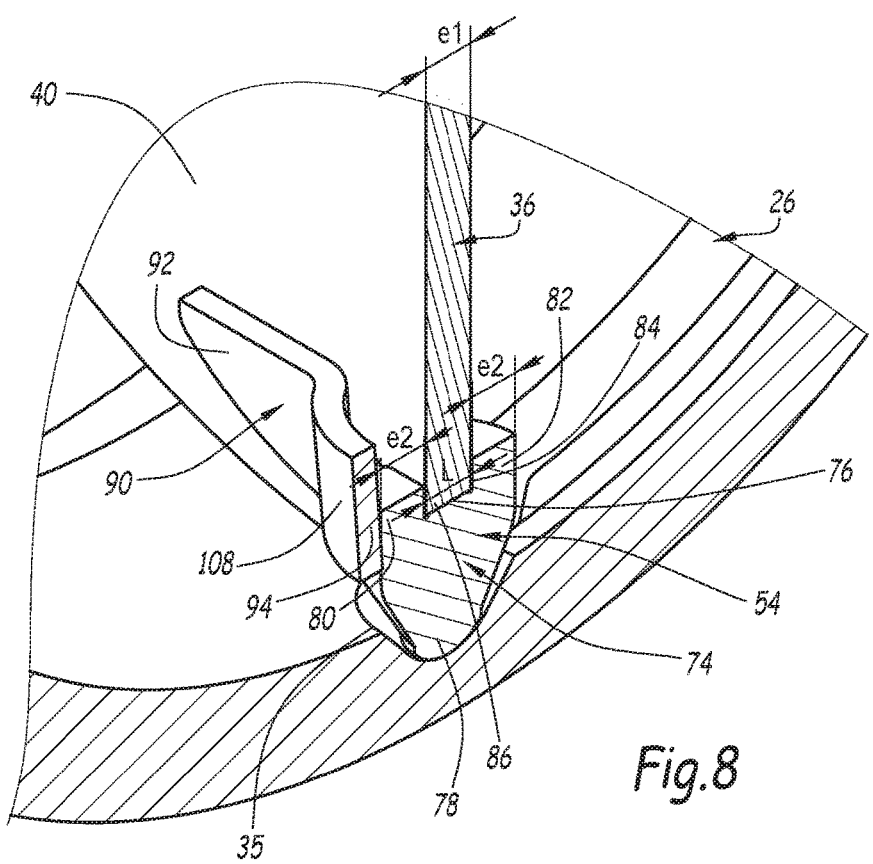
FIG. 8 is a view similar to that of FIG. 4, according to another exemplary embodiment.

In reference to FIGS. 8 and 9, in the third variant, the pressing member 90 is made up of the tongues 92 and the material bridge 94.

A method for manufacturing the valve 24 will now be disclosed, in reference to FIGS. 2 to 9.

First, the valve body 26, the flap 36 and the guiding device 37 are provided, assembled in the manner disclosed above.

Next, a metal strip or plate is taken, in particular made from steel. This strip or plate is stamped, sintered or machined to form the pressing member 90, the pushing in 102 then having a depth p less than the thickness e2 of the lug 80.

The pressing member 90 is next positioned against the face 40 of the flap 36, the bearing plane bearing against the flap 36 and the lug 80 being received in the recess 102. Then the pressing member 90 is welded to said face 40, at least at the tongues 92, for example by tungsten inert gas (TIG) welding, laser welding or resistance welding (the pressing member 90 having to comprise, in this last case, before welding, welding protrusions (not shown) protruding from the bearing faces 96 of the tongues 92), while the pressing member 90 is pressed against the flap 36.

After this welding step, the bearing force is removed, but the pressing member 90 remains constrained by the applied welding. The depth p being less than the thickness e2 of the lug 80, the pressing member 90 keeps the lug 80 pressed against the flap 36. It thus prevents any rotation of the pin 54 relative to the flap 36 around the axis P-P' and any translation of the pin 54 relative to the flap 36 in a direction perpendicular to the plane of the faces 40, 42. As a result, the flap 36 cannot abut against the lugs 80, 82 of the pin 54, which prevents the rattling noises that one may have encountered with the valves of the state of the art.

Lastly, the actuator 38 is assembled to the rest of the valve 24.

Owing to the disclosure discussed above, the rattling noises that may have been encountered with the valves of the state of the art are avoided. Furthermore, this aim is achieved particularly simply and economically, further being able to be applied on existing valves.

Although various embodiments have been disclosed, a worker of ordinary skill in this art would recognize that certain modifications would come within the scope of this disclosure. For that reason, the following claims should be studied to determine the true scope and content of this disclosure.

The invention claimed is:

1. A valve comprising:
   a flap;
   a tubular valve body defining a passageway; and
   a guiding device that guides the flap relative to the tubular valve body for pivoting the flap relative to the tubular valve body about a pivot axis between a closed position and an open position of the passageway, the guiding device comprising a pin traversed by the pivot axis and comprising
      a body with a base and, opposite the base, a free end resting against the tubular valve body,
      two lugs each protruding from the base in a direction opposite the free end, the two lugs defining a slot between the two lugs in which an edge of the flap is received, and wherein the valve includes at least one pressing member, connected to the flap, to press one of the two lugs of the pin against the flap, and wherein the pressing member comprises substantially planar tongues and a material bridge connecting the substantially planar tongues.

2. The valve according to claim 1, wherein the one of the two lugs is embedded between the at least one pressing member and the flap.

3. The valve according to claim 1, wherein the at least one pressing member is attached on a face of the flap.

4. The valve according to claim 1, wherein the slot has a width greater than a thickness of the flap.

5. The valve according to claim 1, wherein the flap and the pin have different thermal expansion coefficients from one another.

6. The valve according to claim 1, wherein the pin has a lower thermal expansion coefficient from that of the flap.

7. The valve according to claim 1, wherein the flap is made from metal and the pin is made from ceramic.

8. The valve to claim 1, wherein the flap, the tubular valve body and the guiding device together form a butterfly valve.

9. The valve according to claim 1, comprising a motorized actuator to control movement of the flap between the closed and open positions.

10. A motor vehicle exhaust line comprising a valve according to claim 1.

11. The valve according to claim 1, wherein the at least one pressing member is welded on a face of the flap.

12. A method for manufacturing a valve comprising
a flap;
a tubular valve body defining a passageway; and
a guiding device that guides the flap relative to the tubular valve body for pivoting the flap relative to the tubular valve body about a pivot axis between a closed position and an open position of the passageway, the guiding device comprising a pin traversed by the pivot axis and comprising
a body with a base and, opposite the base, a free end resting against the tubular valve body, and
two lugs each protruding from the base in a direction opposite the free end, the two lugs defining a slot between the two lugs in which an edge of the flap is received, and
at least one pressing member, connected to the flap, to press one of the two lugs of the pin against the flap, the method comprising the following steps:
supplying the flap and the pin assembled to one another,
supplying the at least one pressing member, the at least one pressing member comprising two tongues together defining a bearing plane of the at least one pressing member against the flap and having, between the two tongues, a recess having a maximal depth smaller than a thickness of at least one of the two lugs of the pin,
positioning the at least one pressing member against the flap, the bearing plane bearing against the flap and the at least one of the two lugs being received in the recess, and
welding the two tongues of the at least one pressing member to the flap.

13. The method for manufacturing according to claim 12, wherein the step for supplying the at least one pressing member comprises supplying a metal strip, followed by stamping of the metal strip to form the at least one pressing member.

14. The manufacturing method according to claim 12, wherein the step for supplying the at least one pressing member comprises supplying a plate, followed by stamping of the plate to form the at least one pressing member.

15. The manufacturing method according to claim 12, wherein the step for supplying the at least one pressing member comprises supplying a metal plate, followed by sintering of the metal plate to form the at least one pressing member.

16. The manufacturing method according to claim 12, wherein the step for supplying the at least one pressing member comprises supplying a metal strip, followed by sintering of the metal strip to form the at least one pressing member.

17. A valve comprising:
a flap;
a tubular valve body defining a passageway; and
a guiding device that guides the flap relative to the tubular valve body for pivoting the flap relative to the tubular valve body about a pivot axis between a closed position and an open position of the passageway, the guiding device comprising a pin traversed by the pivot axis, and wherein the pin comprises
a pin body extending between a base end and a free end, the base end comprising two lugs defining a slot between the two lugs in which an edge of the flap is received, and
wherein the two lugs directly engage the flap, and wherein the free end directly abuts against the tubular valve body, and
at least one pressing member, connected to the flap, to press one of the two lugs of the pin body against the flap, and wherein the at least one pressing member includes a portion that bears directly against a face of the flap.

18. The valve according to claim 17, wherein the pin has a lower thermal expansion coefficient from that of the flap.

19. The valve according to claim 18, wherein the flap is made from metal and the pin body is made from ceramic.

20. The valve according to claim 17, wherein the portion that bears directly against the face of the flap comprises a planar portion that bears against a corresponding planar surface on the face of the flap.

* * * * *